(12) United States Patent
Kravitz et al.

(10) Patent No.: US 12,073,354 B2
(45) Date of Patent: Aug. 27, 2024

(54) SYSTEM AND METHOD FOR FAST CHECKOUT USING A DETACHABLE COMPUTERIZED DEVICE

(71) Applicant: SHOPIC TECHNOLOGIES LTD., Tel Aviv-Jaffa (IL)

(72) Inventors: Eran Menahem Kravitz, Petah Tikva (IL); Raz Aharon Golan, Tel-Aviv (IL)

(73) Assignee: SHOPIC TECHNOLOGIES LTD., Tel Aviv-Jaffa (IL)

( * ) Notice: Subject to any disclaimer, the term of this patent is extended or adjusted under 35 U.S.C. 154(b) by 186 days.

(21) Appl. No.: 17/789,901

(22) PCT Filed: Dec. 29, 2020

(86) PCT No.: PCT/IL2020/051344
§ 371 (c)(1),
(2) Date: Jun. 29, 2022

(87) PCT Pub. No.: WO2021/137219
PCT Pub. Date: Jul. 8, 2021

(65) Prior Publication Data
US 2023/0048635 A1     Feb. 16, 2023

Related U.S. Application Data

(60) Provisional application No. 62/954,722, filed on Dec. 30, 2019.

(51) Int. Cl.
| | | |
|---|---|---|
| *G06Q 10/0833* | (2023.01) | |
| *G06V 20/52* | (2022.01) | |
| *G07G 1/00* | (2006.01) | |
| *G07G 1/01* | (2006.01) | |
| *G07G 3/00* | (2006.01) | |

(52) U.S. Cl.
CPC ......... *G06Q 10/0833* (2013.01); *G06V 20/52* (2022.01); *G07G 1/0018* (2013.01); *G07G 1/0081* (2013.01); *G07G 1/01* (2013.01); *G07G 3/003* (2013.01)

(58) Field of Classification Search
CPC ............. G06Q 10/0833; G06Q 20/208; G07G 1/0018; G07G 1/0081; G07G 1/01; G07G 3/003; B62B 5/0096; G60Q 30/0623; G60Q 30/0633; G60Q 30/0639
See application file for complete search history.

(56) References Cited

U.S. PATENT DOCUMENTS

| | | | | |
|---|---|---|---|---|
| 10,600,043 | B2* | 3/2020 | Chaubard | G06Q 20/208 |
| 10,621,441 | B2* | 4/2020 | Hiramatsu | G07G 1/0081 |
| 10,807,627 | B2* | 10/2020 | Hagen | H04W 4/38 |
| 11,772,696 | B2* | 10/2023 | Hagen | B62B 3/1424 |
| | | | | 235/383 |

(Continued)

FOREIGN PATENT DOCUMENTS

| | | |
|---|---|---|
| FR | 3077404 A1 | 8/2019 |
| WO | 2018144650 A1 | 8/2018 |
| WO | 2019226021 A1 | 11/2019 |

*Primary Examiner* — Hoi C Lau
(74) *Attorney, Agent, or Firm* — Dorsey & Whitney LLP (57) ABSTRACT

The presently disclosed subject matter includes a system and method for fast checkout from a retail store. The system includes a portable computerized device that is configured to track items which are inserted or removed from a shopping container.

26 Claims, 6 Drawing Sheets

(56) References Cited

U.S. PATENT DOCUMENTS

| | | | |
|---|---|---|---|
| 2004/0111320 A1 | 6/2004 | Schlieffers et al. | |
| 2008/0249870 A1* | 10/2008 | Angell | G06Q 30/0269 |
| | | | 705/14.66 |
| 2017/0323376 A1* | 11/2017 | Glaser | G06Q 20/203 |
| 2018/0218351 A1* | 8/2018 | Chaubard | G07G 1/0081 |
| 2018/0253604 A1* | 9/2018 | Hiramatsu | G06V 20/52 |
| 2018/0330196 A1* | 11/2018 | Chaubard | G06F 15/76 |
| 2019/0005479 A1* | 1/2019 | Glaser | G06Q 30/06 |
| 2020/0198680 A1* | 6/2020 | Hagen | H04W 4/38 |
| 2023/0048635 A1* | 2/2023 | Kravitz | G07G 1/0063 |
| 2024/0070880 A1* | 2/2024 | Moshkovitz | G06V 10/764 |

\* cited by examiner

SYSTEM AND METHOD FOR FAST CHECKOUT USING A DETACHABLE COMPUTERIZED DEVICE

TECHNICAL FIELD

The presently disclosed subject matter relates to a computerized shopping device.

BACKGROUND

Checkout in retail stores is a point of friction for consumers who often must wait in lines. This causes inconvenience to consumers, as well as losses of revenue to retailers, as often consumers decide to abandon their purchases due to the wait time, or do not go to the store at all during known rush hours. Existing approaches to reduce this point of friction are either expensive to implement, or carry a heavy operational burden which makes them less effective.

GENERAL DESCRIPTION

The presently disclosed subject matter includes a system and method for fast checkout from a retail store. The system includes a portable computerized device that is configured to track items which are inserted or removed from a shopping container. The disclosed system and method enable to completely remove or considerably reduce the need for intervention of another human, such as a store employee, in the shopping process in general and more specifically during checkout.

The disclosed subject matter includes a portable computerized device configured for tracking items in a shopping container; the device comprises a scanner, one or more cameras, and a processing circuitry comprising one or more computer processors, wherein at least one camera is configured to capture one or more images of the item being inserted to or removed from the container; the processing circuitry is configured to apply one or more machine learning models on the images and both detect insertion or removal of an item to/from the shopping container, as well as identify what item it is. The processing circuitry is further configured to add or remove the item to/from a list of purchased items, as appropriate.

According to one aspect of the presently disclosed subject matter there is provided a portable computerized device configured for tracking items in a shopping container; the device comprises a scanner, one or more cameras, and a processing circuitry comprising one or more computer processors;
  wherein at least one camera is configured to capture one or more images of an item being inserted to or removed from the container;
  the processing circuitry is configured while operating in a frictionless mode to:
  process the one or more images and detect insertion or removal of the item from the container;
  identify the item using one or more machine learning models applied on the one or more images, and add/remove the item to/from a purchase item-list;
  the scanner is configured to provide scanning output data in response to scanning of a respective identification tag (e.g. barcode, RF tag, etc.) associated with the item.
In addition to the above features, the device according to this aspect of the presently disclosed subject matter can optionally comprise one or more of features (i) to (xvi) below, in any technically possible combination or permutation:
  (i) The portable computerized device, wherein in case the one or more machine learning models fail to identify the item, the processing circuitry is further configured to generate and prompt instructions to a user requesting the user to scan the identification tag with the scanner.
  (ii) The portable computerized device, wherein, in case the one or more machine learning models fail to identify the item, the processing circuitry is configured to:
  identify the item based on scanning output data generated by the scanner in response to scanning of a respective identification tag associated with the item; and
  link between the one or more images and the respective scanning output data; add the one or more images and the respective scanning output data to a training dataset that is used for training at least one machine learning model to thereby update the training dataset and enable the model to be applied to one or more images of the item and identify the item.
  (iii) The portable computerized device is connected over a communication network with another computer device, wherein the processing circuitry is configured, instead or in addition to the detection and identification of the item, to transmit to the other computer device the one or more images, wherein the one or more machine learning models are applied on the one or more images at the other computer device;
  the processing circuitry is configured to receive, from the other computer, data indicative of detection of insertion/removal of the item to/from the container and/or data identifying the item.
  (iv) The portable computerized device, wherein in case the one or more machine learning models identify a plurality of possible identities of the item, the processing circuitry is further configured to:
  generate and prompt instructions to a user:
  requesting the user to select a correct identity from a list, listing the plurality of possible identities of the item;
  or otherwise, in case none of the presented identities is correct, requesting the user to use the scanner device to scan a respective identification tag of the item.
  (v) The portable computerized device, wherein the processing circuitry is further configured, responsive to selection of a correct identity by the user or the scanning data output, to: link between the one or more images and data indicative of the correct identity; update a training dataset to thereby enhance the ability of the model to be applied to one or more images of the item, and identify the item.
  (vi) The portable computerized device, wherein the processing circuitry is configured, while operating in training mode, to:
  identify the item based on scanning output data generated by the scanner in response to scanning of a respective identification tag associated with the item; and
  link between the one or more images and the respective scanning output data; add the one or more images and the respective identification of the scanning output data to a training dataset that is used for training at least one machine learning model to thereby enable the model to be applied to one or more images of the item and identify the item.
  (vii) The portable computerized device, wherein the processing circuitry is further configured to:

following detection of insertion or removal of the item to/from the container, and in case no scanning output data or incomplete scanning output data is received from the scanner, provide data indicating to a user that the item should be scanned.

(viii) The portable computerized device, wherein following detection of insertion or removal of the item to/from the container, and in case no scanning output data or incomplete scanning output data is received from the scanner, the processing circuitry is further configured to generate and/or store data indicating that a suspicious event has occurred (e.g. generate an alert to the user and/or to a store employee).

(ix) The portable computerized device, wherein in case of a false-detection or miss-detection by the machine learning module, the processing circuitry is configured to: link between one or more images captured before the false-detection or miss-detection; add the one or more images to a training dataset that is used for training a detection machine learning model serving as an example of false-detection or miss-detection to thereby improve detection of insertions by the machine learning model and reduce false positive detections or false negative detections, respectively.

(x) The portable computerized device further comprises a local data-storage and is configured to store data that includes the one or more images and the respective identification tag and/or the scanning output data (obtained for example following scanning of the barcode by the user or following selection of the item from a list e.g. displayed on the device display) on the local data storage and transmit the data stored to another computer.

(xi) The portable computerized device, wherein the device is designed to be releasably attached to the container.

(xii) The portable computerized device, wherein the device is designed to be releasably attached to a mount which is fixedly attached to the container and configured to receive and hold the device.

(xiii) The portable computerized device, wherein the shopping container is any one of: shopping cart; and a shopping basket.

(xiv) The portable computerized device, wherein the device is configured to automatically and continuously gather new information including scanning output data linked to respective captured images and thereby enhance and enrich a training dataset of the machine learning model.

(xv) The portable computerized device comprises two or more cameras.

(xvi) The portable computerized device is a Smartphone.

According to another aspect of the presently disclosed subject matter there is provided a method of tracking items in a shopping container; the method comprising:
releasably attaching a computerized device to a shopping container, the device comprising a scanner, one or more cameras and a processing circuitry comprising one or more computer processors;
providing scanning output data in response to scanning a respective identification tag associated with the item using the scanner;
capturing, using at least one camera, one or more images of an item being inserted or removed from the container;
the scanner is configured to provide scanning output data in response to scanning of a respective identification tag associated with the item;
utilizing a processing circuitry while operating in frictionless mode for:
processing the one or more images and detecting insertion or removal of the item from the container;
identifying the item using one or more machine learning models applied on the one or more images, and adding/removing the item to/from a purchase item-list.

According to another aspect of the presently disclosed subject matter there is provided a computer readable storage medium having data stored therein representing software executable by a computer, the software including instructions for a method of tracking items in a shopping container using a computerized device comprising a scanner, one or more cameras and a processing circuitry comprising one or more computer processors; the storage medium comprising:
instructions for providing scanning output data in response to scanning a respective identification tag associated with the item using the scanner;
instructions for capturing, using at least one camera, one or more images of an item being inserted to or removed from the container;
instructions for processing the one or more images and detecting insertion or removal of the item to/from the container;
instructions for identifying the item using one or more machine learning models applied on the one or more images, and adding the item to a purchase item-list.

According to another aspect of the presently disclosed subject matter there is provided a computerized system for fast checkout; the system comprising:
a plurality of portable computerized devices each configured for tracking items in a shopping container and a training computer server device operatively connected to the plurality of portable devices over a communication network;
each portable computerized device comprises a scanner and at least one camera and a processing circuitry;
wherein at least one camera of each device is configured to capture one or more images of an item being inserted to or removed from the container;
wherein the processing circuitry of each device is configured while operating in training mode to:
identify the item based on scanning output data generated by the scanner in response to scanning of a respective identification tag associated with the item; and
link between the one or more images and the respective scanning output data to thereby give rise to linked-data (e.g. ML tagged data); transmit the linked-data to the training computer server device;
wherein the training computer server device (e.g. AI Training Server 700) is configured to:
add the linked-data to a training dataset that is used for training one or more machine learning models to thereby enable the model to be applied to one or more images of the item and identify the item; and
transmit the one or more machine learning models to the plurality of computerized portable devices;
the processing circuitry of each device is configured while operating in a frictionless mode to:
process the one or more images and detect insertion or removal of the item to/from the container;
identify the item using the one or more machine learning models applied on the one or more images, and add the item to a purchase item-list.

The method, non-transitory storage device and system disclosed herein according to various aspects, can optionally further comprise one or more of features (i) to (xvi) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components, and circuits have not been described in detail so as not to obscure the presently disclosed subject matter.

Unless specifically stated otherwise, as apparent from the following discussions, it is appreciated that throughout the specification discussions utilizing terms such as "processing", "providing", "generating", "adding", "linking", "identifying" or the like, refer to the action(s) and/or process(es) of a computer that manipulate and/or transform data into other data, said data represented as physical, such as electronic, quantities and/or said data representing the physical objects.

The terms "computer", "computing/computerized device", "terminal" or the like, should be expansively construed to include any kind of hardware-based electronic device with a processing circuitry (e.g. digital signal processor (DSP), a GPU, a TPU, a field programmable gate array (FPGA), an application specific integrated circuit (ASIC), microcontroller, microprocessor etc.). The processing circuitry can comprise, for example, one or more processors operatively connected to computer memory, loaded with executable instructions for executing operations as further described below. For example, device 300 described below, is a computerized device comprising one or more processing circuitries and one or more cameras.

Figure 1:
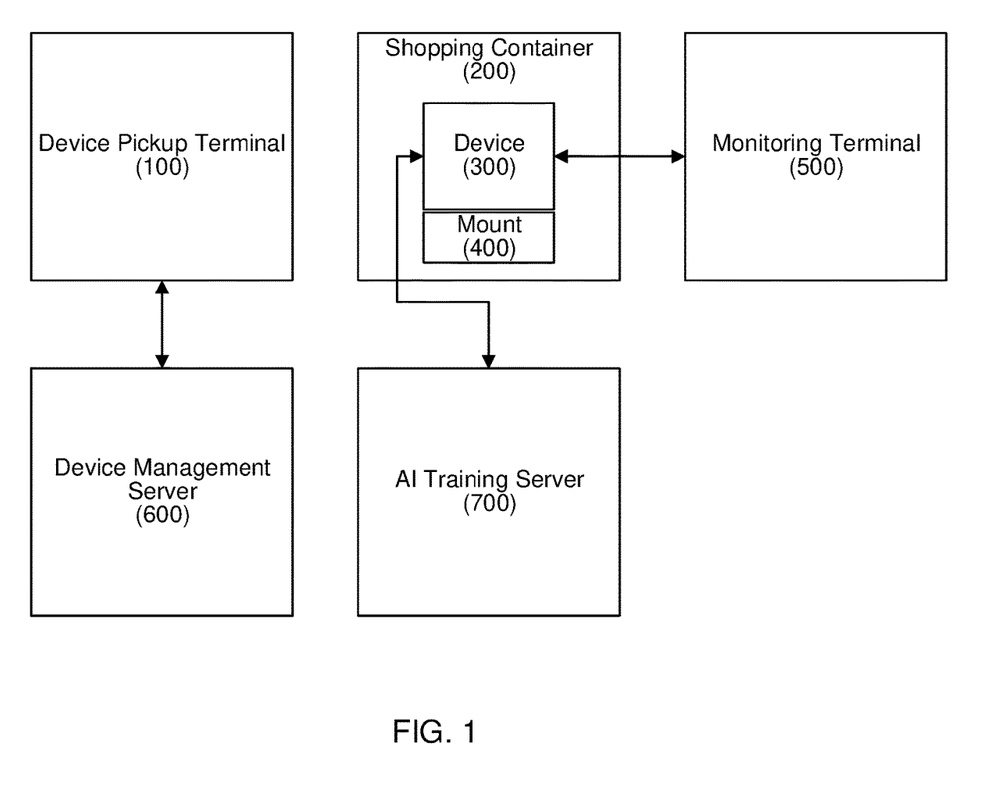
FIG. 1 is a block diagram schematically illustrating a system, in accordance with certain examples of the presently disclosed subject matter.
Figure 2:
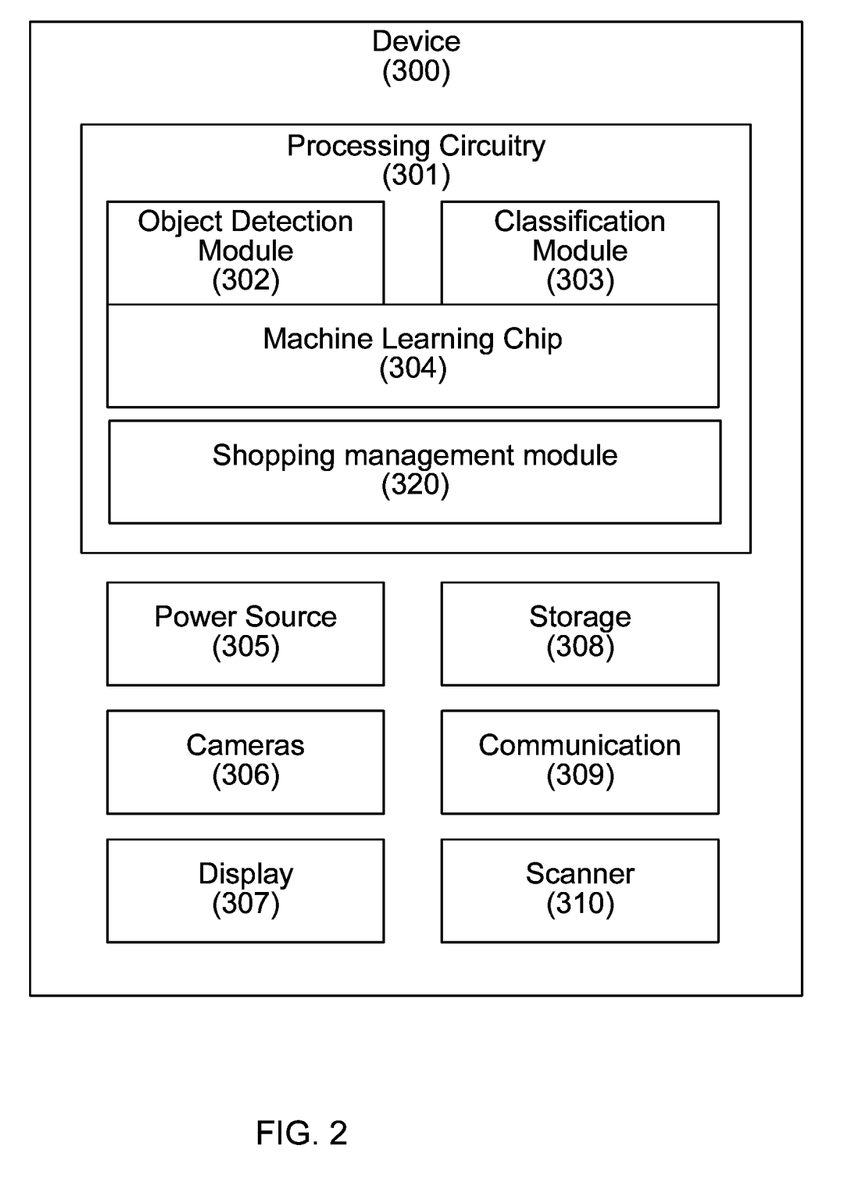
FIG. 2 is a block diagram schematically illustrating a portable computerized shopping device, in accordance with certain examples of the presently disclosed subject matter.
Figure 4:
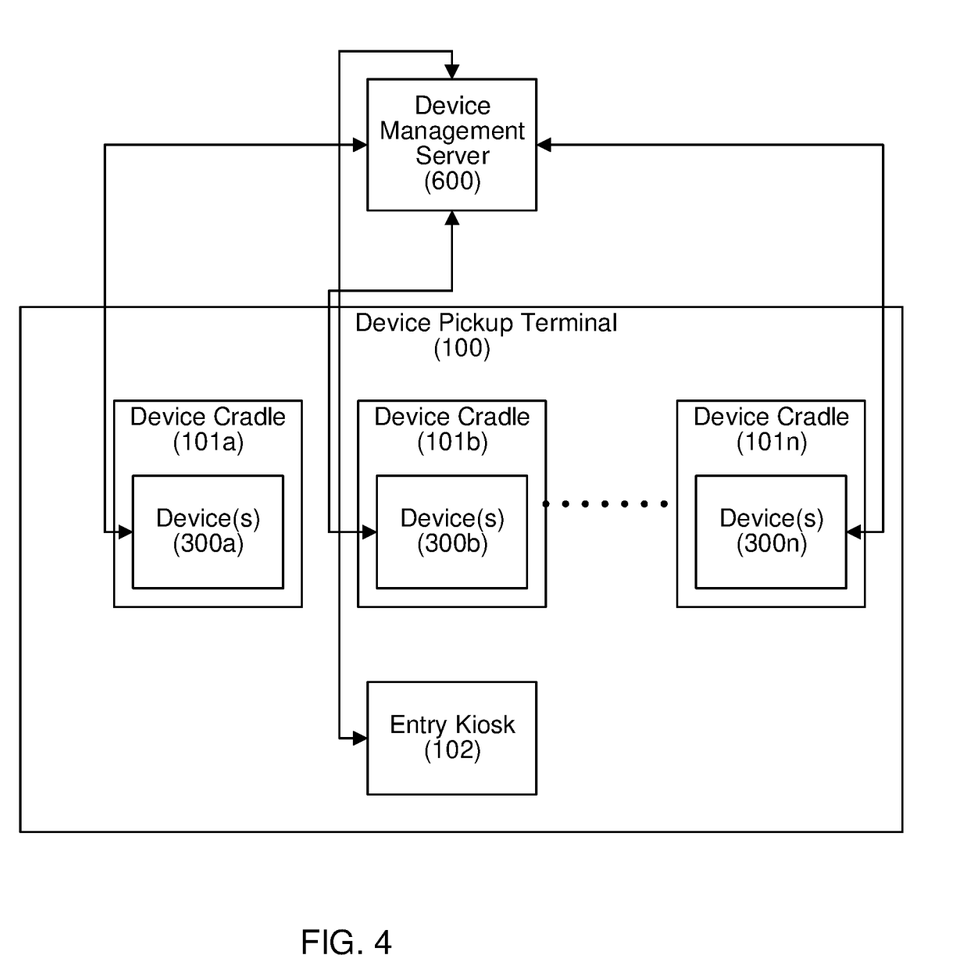
FIG. 4 is a block diagram schematically illustrating a device pickup terminal, in accordance with certain examples of the presently disclosed subject matter.

FIGS. 1, 2 and 4 illustrate various aspects of the system architecture in accordance with some examples of the presently disclosed subject matter. Elements in FIGS. 1, 2 and 4 can be made up of a combination of software and hardware and/or firmware that performs the functions as defined and explained herein. Functional elements in FIGS. 1, 2 and 4, which are drawn as a single unit, may be divided, in practice, into several units, and functional elements in FIGS. 1, 2 and 4, which are drawn as separate units, may be consolidated, in practice, into a single unit.

Figure 5:
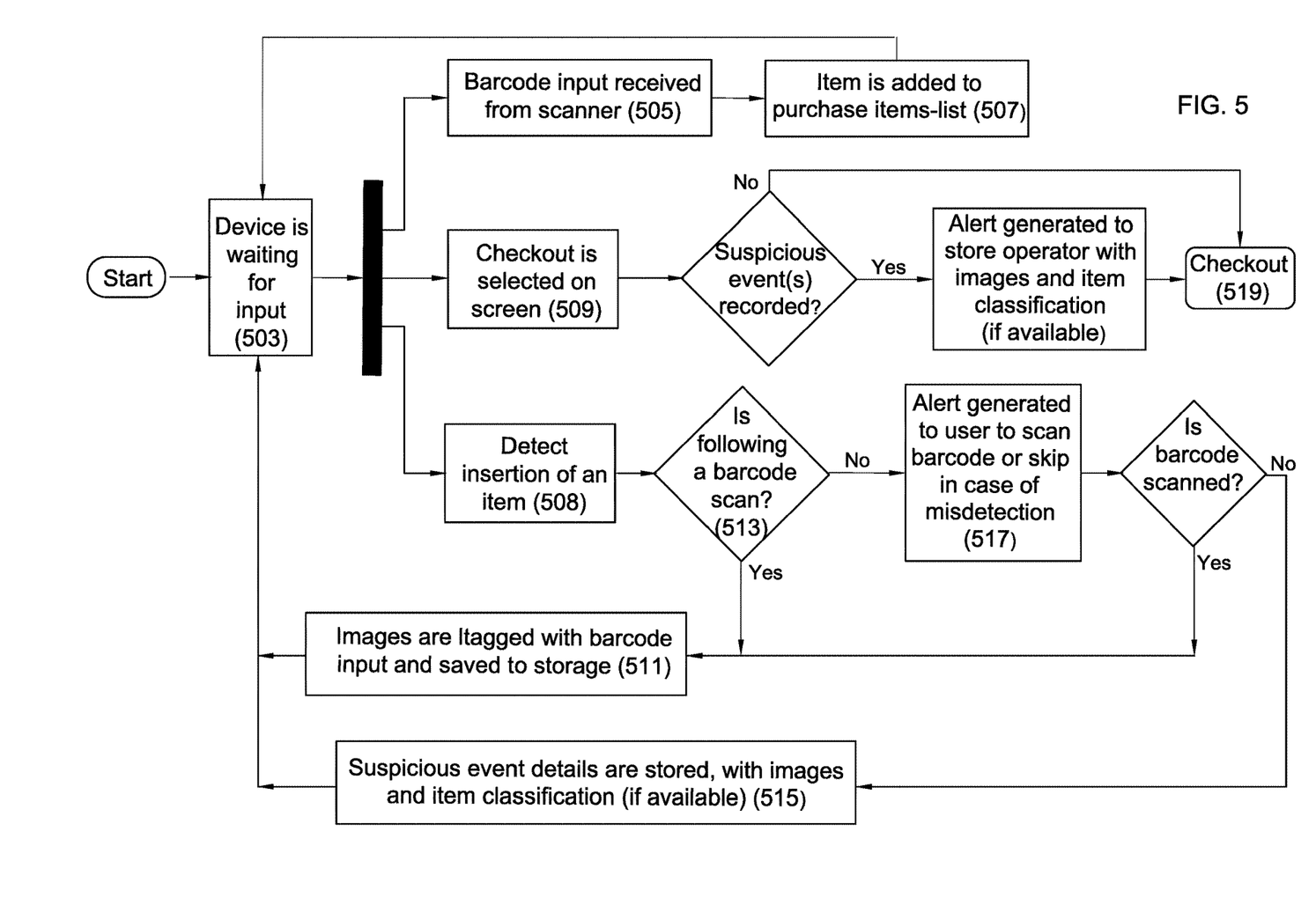
FIG. 5 is a flow-chart of operations performed during a shopping trip with the device, in accordance with certain examples of the presently disclosed subject matter.
Figure 6:
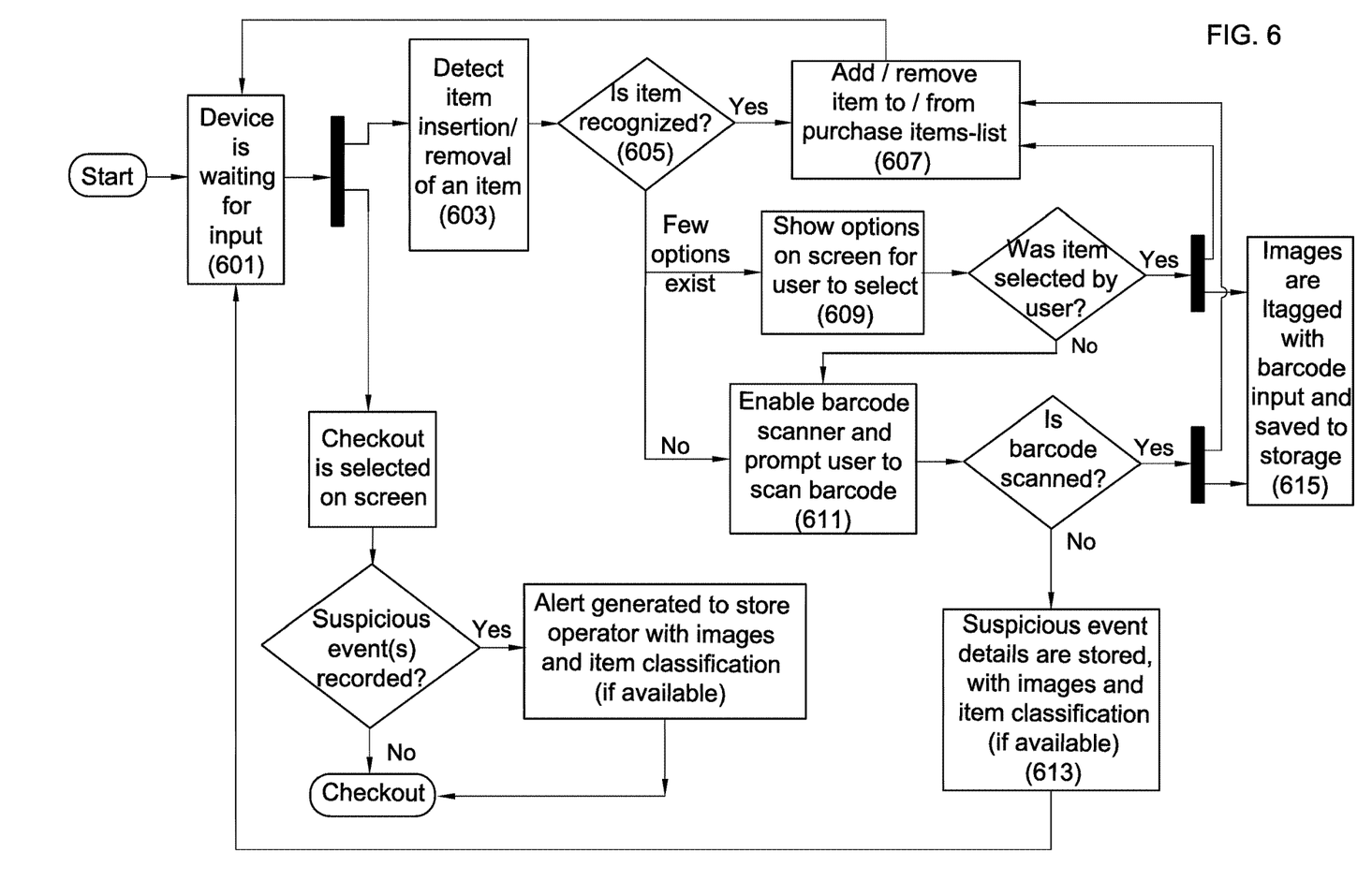
FIG. 6 is another flow-chart of operations performed during a shopping trip with the device, in accordance with certain examples of the presently disclosed subject matter.

It is noted that the teachings of the presently disclosed subject matter are not bound by the flow chart illustrated in FIGS. 5 and 6. In embodiments of the presently disclosed subject matter, fewer, more and/or different stages than those shown in FIGS. 5 and 6 may be executed. In embodiments of the presently disclosed subject matter, one or more stages illustrated in FIGS. 5 and 6 may be executed in a different order and/or one or more groups of stages may be executed simultaneously.

It is also noted that whilst the flow charts are described with reference to elements of the system and devices described with reference to FIGS. 1, 2 and 4, this is by no means binding to the specific design illustrated in these images.

Bearing this in mind, attention is drawn to FIG. 1 illustrating different components of a system according to some examples. System 100 comprises a plurality of interconnected computerized devices that communicate over one or more communication networks. Device Pickup Terminal (100) is a computerized device configured to receive input from a user requesting to release a portable shopping device (300), and determine whether to release a portable device (300) and allow the user to use it. In some examples, determining whether to release a portable device (300) is made by a request that is sent from the pickup terminal to a Device Management Server (600) running some internal logic (e.g. checking user's credentials inserted at the pickup terminal). In other examples, the request to release a portable device (300) may be made from the device itself (300) and not from a separate Device Pickup Terminal (100).

Once a device (300) has been released, it is mounted by the user on a shopping container (200) (e.g. shopping cart or a basket). In some examples, device (300) is placed on a mount (400) (made for example from plastic) preinstalled on the shopping container (200). According to other examples, the device (300) may be designed in such a way that it can be attached (e.g. by a clip) onto the shopping container directly without the need for a mount (400).

Device (300) comprises one or more cameras that are configured to monitor the contents of the shopping container and detect events when items are placed within or removed from the shopping container (200). As further explained below, device (300) is further configured to identify the item that was inserted or removed from the container. In some examples, under certain conditions, a security alert is generated, alerting the user, e.g. via the display and/or audio source on the device (300) and/or alerting store personnel e.g. via a separate monitoring terminal (500).

In some examples, devices (300) communicate with an AI Training Server (700), which is configured to receive data uploaded by devices 300 (for example, tagged data including images of items along with their corresponding barcodes and/or respective barcode data output describing the item), and use the received data as training data for generating newer versions of machine learning (ML) models which are used for this purpose. In some example, devices (300) are configured to tag classified data and store the tagged data to be later uploaded to the AI Training Server computer(s) device (700).

When a new and/or improved version of the ML model(s) becomes available (after being generated by server 700), it is communicated back to the devices (300). This way, the accuracy and efficiency of detection and identification of the machine learning model is continuously improved. According to some examples, newly generated training data is continuously and automatically gathered during shopping and is uploaded to AI training server (700), and used for re-training the ML model(s) in order to continuously improve its performance.

Examples of benefits of re-training the ML model(s) include: enabling to identify new items previously not identified by the model (e.g. items newly added to the store); enabling or enhancing identification of existing items whose appearance has changed (e.g. new packaging of existing items); and improving the confidence of identification of the model of existing items.

In some examples, this process occurs repeatedly (e.g. periodical), and fully automatically, without any human intervention of a system operator. In some examples, communication that is not time-sensitive can be controlled if necessary, for example, the uploading of data and/or the downloading of new model versions can be done when the device is idle, and can be actively limited by bandwidth requirements.

FIG. 2 illustrates different components of the portable device (300). Device (300) is a computerized device comprising processing circuitry (301) which is configured to effectively execute machine learning models (also referred to as "machine learning algorithms") for the purpose of implementing various methods (including computer vision methods) dedicated to detection and classification of items inserted/removed to/from the shopping container based on videos and images captured from the device's camera(s) (306).

To this end Device (300) can comprise for example a Machine Learning Chip (304) comprising the appropriate circuitry 301 configured for this purpose. In some examples, chip 304 comprises Object Detection module (302) and Classification module (303), configured to execute various machine learning algorithms, including, by way of example: object (item) detection algorithms and object classification algorithms, respectively. As mentioned above, object detection includes the detection of an event of insertion or removal of an item to/from the shopping container and object classification includes identifying which item has been inserted or removed to/from the shopping container.

In one example, device (300) further comprises a single camera. In other examples, device (300) comprises two or more cameras, which are positioned such that when the device is attached to a shopping container, if one camera's view is somehow blocked, for example, by the user's hand holding the item, the other camera still has a clear view of the container and can capture the item. The device is detachable and portable, running, for example, on a portable Power Source (305) which can be charged for example when stationary at the Pickup Terminal (see below). In some examples, when placed in a cradle in the pickup terminal (100), the device switches to standby state, e.g. power saving and charging state. In addition, device (300) comprises a user interface that may include a display (307) to enable a user interaction (input & output). Display (307) can be used for example, for displaying shopping related information or for providing warnings or guidance to the user. Shopping related information can include, by way of non-limiting example, one or more of: the current contents of the shopping container, the prices of items added to the shopping container, the current total sum of the goods in the shopping container, previous shopping lists, etc.

A computer data storage (308) unit may exist on the device (300), configured to store data, including, for example, images and videos captured by the cameras. Additionally, or alternatively, a computer data storage can be located in a terminal located in the store, in which case data is transmitted from the devices to the terminal and stored at the terminal. In further examples, data storage may be located at remote computer servers (in which case data can be transferred immediately to remote computer servers without being stored on the device).

Device 300 can further comprise Communication unit (309), such as WiFi or Bluetooth, or any other suitable protocol and/or technology configured to facilitate communication with different systems external to the device (300), such as but not limited to a cart-management server, an AI Training Server (700), or a payment terminal.

Device 300 can further comprise Scanner (310) configured to be used for scanning an identification tag and obtaining the scanning data output in response to scanning of the tag. The scanning data output is descriptive of an associated item and includes, for example, the respective stock keeping unit (SKU) of the item, which enables to uniquely identify the item and associate it with any other data describing the item. In some examples the data may include the name of the item, the price of the item, the catalogue number, etc. It is noted that the term "scanner" should be broadly construed to include any appropriate scanner or scanning technique. For example, the scanner can be a dedicated scanner device or a camera operating as a scanner by implementing appropriate software.

The term "identification tag" is used herein as a general term which is meant to include any type of identifier such as a barcode, RFID tag, NFC, or the like. It is noted that the term "barcode" is used herein by way of example only and by no means intends to limit the disclosed subject matter to barcodes alone. Any other identification tag implemented any technique of identification, is also contemplated within the scope of the disclosed subject matter.

Figure 3:
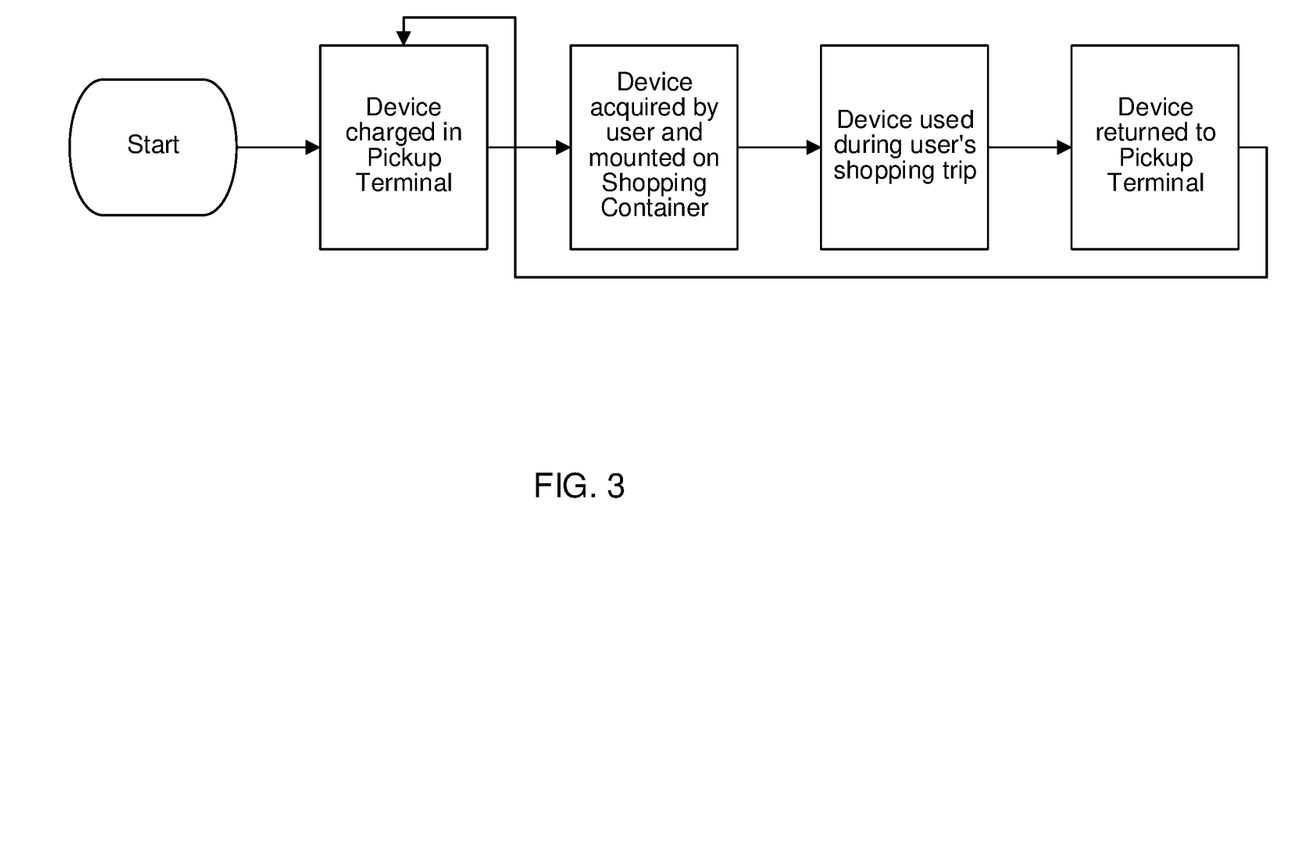
FIG. 3 is a generalized flow-chart showing a high level view of a process, in accordance with certain examples of the presently disclosed subject matter.

FIG. 3 illustrates a high-level flow-chart of operations executed by device (300), in accordance with certain examples of the presently disclosed subject matter. At first, the device is idle in the Pickup Terminal (100), e.g. with its Power Source (305) being charged. Next, the device is removed from the Pickup Terminal by a user and is mounted on the shopping container (200; e.g. shopping cart), for example, using a clip-on mechanism, or using a mount piece (400) installed on the shopping container. The device is then used during the shopping trip of the user, as specified further below. When the trip is completed, the device is placed back in the Pickup Terminal, and this cycle repeats itself with the next user.

FIG. 4 illustrates a block diagram of the device pickup terminal (100), according to some examples of the presently disclosed subject matter. In other examples, a Pickup Terminal is not necessary, and the device (300) may be a personal device owned by the user, such as a smartphone running appropriate software. In the Pickup Terminal example, however, different devices (300$_{a\ldots n}$) are locked inside multiple different Device Cradles (101$_{a\ldots n}$). Each Device Cradle may store and provide charging power to multiple device units (300). In some examples, an Entry Kiosk (102), which includes a computer terminal that can receive input, for example, via a touchscreen, is operatively connected to the pickup terminal. The Entry Kiosk is configured to allow user interaction and receive input from a user indicating the user's desire to unlock a device. In some examples, the user is required to provide credentials, e.g. by typing a username and password, a phone number, or a biometric identifier at the Entry Kiosk computer. After running some internal logic, for example, sending a request to a Device Management Server (600) which executes a user authentication process, checking whether a device is available and determining whether the user is authorized to use a device, the Entry Kiosk may deny access, or release a device (300) for the user. If released, the user's attention may be directed to the released device, for example, with a sound and/or lighting around the unlocked device, and/or text on the Entry Kiosk. The user takes the device and puts it on the cart, for example, using a clamp or a plastic mount unit preinstalled on the shopping container. In some examples, the device (300) is configured to detect that it has been mounted, for example, using a physical and/or or electronic mechanism that is activated (e.g. to generate a signal) when the device is connected to the mount. At that point, the device is ready to be used for the shopping trip.

FIG. 5 and FIG. 6 are flowcharts illustrating examples of operation flows executed by the device according to different modes of operation. In some examples, as described with reference to FIG. 5, when initially deployed, the devices (300) can be configured to operate in a Secure Mobile Checkout mode (also referred to herein as "Training mode"). In this mode, the machine learning algorithms can be used to detect and identify items being inserted or removed from the shopping container. At block 503, the Scanner (310) is operating, awaiting user input e.g. in the form of a barcode read. Initially, the device is idle, waiting for input. The user (shopper) takes an item from a shelf, scans it against the scanner, and places it in the shopping container. When a barcode of an item is scanned by the scanner, the respective scanning output data is retrieved from the barcode (block 505), and the device (300) adds the item to a purchase items-list, (block 507). This can be carried out for example by processing circuitry (301) running a shopping management module (320), configured to manage the shopping experience, inter alio, by implementing a virtual purchase items-list, listing items added to the shopping container, and executing the checkout stage, as further explained below. The retrieved data may include, for example, name of item, image of item, price of item, etc. This can be reflected to the user, for example, on the Device's Display (307) and/or via a sound effect. The device (300) can then return to being idle, waiting for the next input.

As mentioned above, one or more cameras (306) are configured to capture images of items which are inserted or removed from the shopping container. Various algorithms can be implemented for detecting the insertion or removal of items, including for example object detection algorithms or tracking algorithms. In case an item being inserted to the container (e.g. shopping cart) is detected by one or more cameras (306) of the device (block 508), the device checks (e.g. by object detection module) whether this input (i.e. detection of insertion of item) immediately follows a barcode read input (block 513). This can be done for example, by measuring whether the item detection is received within a reasonable time interval since the last barcode read.

If a valid barcode read input is detected, computer storage (local and/or remote) can be used for storing the images of the item detected by the Cameras(s), as well as the respective barcode scanning output read by the Scanner (block 511). This provides a kind of an automatic tagging process where images of a certain item are being automatically linked (associated) with the respective barcode scanning output data (herein after "ML training data"). This process is repeated numerous times by different devices (300), each time a shopper is using a device for shopping, thereby allowing to generate a tagged dataset for training the machine learning models, where data for updating the dataset is being continuously collected during shopping. The information, linking (associating) between a barcode (and its data) and captured images, can serve later as tagged data for improving the Machine Learning algorithms/models.

In some cases, when operating in Secure Checkout mode, when the classification machine learning models are trained well-enough for identifying an item, the device can also identify the inserted item by processing the images captured by the Cameras (306) using the machine learning algorithms and compare the item's barcode with the scanned barcode in order to validate the barcode attached to the item and provide feedback in case of a mismatch between a scanned barcode and an inserted item. If a mismatch between the scanned barcode and the identified item is detected, the system can record this as a suspicious event, as specified below. The device (300) then reverts to wait state—waiting for input.

Thus, during operation in the Secure Checkout mode, the camera(s) serve several purposes. One purpose is for the detection of insertion or removal of items to the container, an event which is expected to follow a barcode scanning operation or otherwise triggers an alert. Another purpose is for generating a training dataset, which is used for training the ML algorithms to enable the frictionless operation mode as described below.

If the detection of insertion of an item does not follow a barcode read, or the barcode read is incomplete (the Scanner failed to read the barcode; negative answer to block 513), an alert can be generated to the user (block 517), prompting him to scan the barcode of the item just inserted. The alert can be, for example, a visual (e.g. on the Display; including for example presenting the captured images of the item) and/or an audible alert. The user may then remove the relevant item from the shopping container, scan its barcode, and put it back in, in which case the images captured during the insertion, along with the scanned barcode, can be stored as described above (block 511), and the device (300) waits for the next input. In case the user selects not to scan an item—claiming for example a system misdetection, the system can record this as a suspicious event, and can store, among other things, the images captured of the supposedly detected item (block 515). The system then reverts to wait state—waiting for input.

In some examples, when operating in Secure Checkout mode, when the object detection ML models are trained well-enough for detecting insertion or removal of an item, the device can also detect the insertion or removal of an item by processing the images captured by the Cameras (306) using the machine learning algorithms. The object detection ML models can also be trained and improved using data continuously gathered when operating in Secure Checkout mode.

Following scanning of an item an insertion of an item is expected to occur. According to some examples, in case following scanning of an object the object detection module 302 fails to detect the insertion (i.e. misdetection), images captured immediately after the scanning (e.g. a video 1-5 seconds long) which were processed and provided the misdetection can be stored and added to the training dataset along with metadata describing the misdetection. This data can be used during the training process serving as examples of misdetection, thus helping to improve item detection by the detection machine learning model and reduce false-negative detections.

Likewise, in case an insertion was erroneously detected by the object detection module 302 although an insertion event did not occur (i.e. false-detection, for example, in case the user or a store employee provides feedback through the user interface indicating no scanning has occurred), images captured during a time period preceding the false detection which were processed and provided the false-detection can be stored and added to the training dataset along with metadata describing the false-detection. This data can be used during the training process serving as examples of false-detection, thus helping to improve item detection by the detection machine learning model and reduce false positive detections.

When the user has finished placing in the container all the items he wishes to purchase, he chooses the checkout option (block 509), for example, by touching an appropriate button on a graphical user interface displayed on the Display. The system can then check if any suspicious events have been recorded during the session, and according to some predefined logic (for example, based on the number of incidents and/or confidence levels of the event(s)), an alert may be generated to a store employee. The sensitivity of this process can be configurable and may change based on the retailer's requests. The checkout process can be executed for example, by shopping management module (320).

The remainder of the process—for example, a check by a store associate, and/or payment (checkout; block 519)—can be done in any one of multiple ways. Checkout may be completed on the device itself, using a digital payment method such as a digital wallet, entering a credit card number, etc., or in some cases, the device may include circuitry for supporting physical processing of a credit-card, NFC-based payment solutions, or others. In other cases, and depending on the retailer's need, the user may be required to digitally transfer (e.g. using Wi-Fi, Bluetooth, NFC, or any other appropriate technique) the purchase items-list from the Device to a checkout terminal, where payment will take place in any number of possible methods. In case an alert has been activated, a check by a store employee may be performed prior to the checkout phase, and, after which the user would complete the checkout and return the device. If no suspicious events were recorded, or if an alert has not been generated otherwise, the user may go directly to the checkout phase without any human intervention.

The resolution of alerts can be used to determine the correct association between an identification tag and captured images, data which can be added to the training dataset and used for further training the ML models. For example, a suspicious event that was not handled by the user, and is resolved by a store employee (e.g. during checkout), for example, by selecting a correct item from a list, scanning a barcode of the item using the scanner, or in some other manner, provides the correct identification tag of a purchased item. The identification tag can be linked to images captured during the insertion or removal of the item and used to enrich the training dataset.

As mentioned above, ML training data that may have been stored during the shopping trip, or is otherwise gathered, which can include images of different items captured from different angles by different devices and associated with (e.g. tagged with) their corresponding barcodes and/or barcode data output, read at the Scanner, can be used for improving the machine learning algorithms.

For example, the data may be transmitted, (e.g. using a Wi-Fi communication module) to the AI Training Server (700). The AI Training Server can be configured to periodically re-run the learning algorithm with the new, automatically generated data. In other examples, the ML training may be done locally on different devices (300) and training output results can be shared between the devices to improve the machine learning model that is run by all devices. This can be accomplished for example by implementing federated learning (also known as collaborative learning), which is a machine learning technique that trains an algorithm across multiple decentralized edge devices or servers.

It is noted that the process described above with respect to FIG. 5 discloses one method of generating a dataset for training machine learning models which is carried out while a person is shopping. However, this should not be construed as limiting, and the presently disclosed subject matter also contemplates other methods of generating the dataset which can be used instead of or in addition to the method described above. One such alternative method is one which involves capturing images of the various items and linking the images to respective scanning output data in a process separate from shopping dedicated specifically to the purpose of generating the training dataset.

Once the Machine Learning algorithm complies with one or more predefined conditions (e.g. the machine learning models exhibits a certain level of accuracy with respect to a certain minimal percentage of the items sold in a given store), the devices can be switched to operate in frictionless mode as further described with reference to FIG. 6. According to some examples, in this mode, the Barcode Scanner can initially be inactive (e.g. turned off), and only the images captured by the Camera(s) are processed and used for detecting when an item is inserted or removed from the cart (e.g. using object detection module 302; block 603). When this happens, the Processing Circuitry (301) on the device is configured to process the captured images, and infer which barcode is associated with the item captured in the images or videos (e.g. using object classification module 303; block 605).

Notably, according to other examples, the ML models can be executed on a remote computer device (implementing for example object detection module 302 and object classification module 303 module) rather than device (300). According to this example, information, including images captured by the cameras (306), is transmitted to a remote computer device (e.g. a remote server device connected to device 300 over the Internet or a local network), where the machine learning models are executed and the output is sent back to device 300.

In some examples, if the identity of a single item is inferred with sufficient confidence (positive answer in block 605), that item may be added/removed from the purchase item-list (e.g. implemented as a virtual shopping cart) as appropriate (depending on whether the item has been added or removed from the container; block 607). This can be reflected to the user, for example, through the display and/or a sound effect. The device then goes back to waiting for input (block 601).

In some examples, if however, the machine learning model infers that the item can be any one of multiple items without a clear distinction of which one, this data is reflected to the user (block 609). For example, the possible items can be shown to the user on the Display, alongside the images captured of the item, and the user may be asked to select the correct item. If the user selects one of the items, or otherwise indicates that it is a different barcode altogether (e.g. by scanning the barcode with the scanner (310); block 611), that item can be added/removed from the virtual cart as appropriate, as mentioned before (block 607). Additionally, the images of that item, as well as its associated barcode (as selected by the user), can be used for enhancing the Machine Learning data, thus improving its accuracy of item identification (block 615). For example, the captured images and the barcode indicated by the user can be linked and stored on a local or remote storage unit, and used later in a training process. The device then goes back to waiting for input.

In some examples, if the user does not select one of the options, but instead provides input indicating that all choices are wrong, or alternatively, if the system was completely unable to infer the item in the first place (e.g. providing inference with confidence level below a certain threshold; negative answer in block 605), the Barcode Scanner can be activated, and the user can be instructed to scan the barcode of the item (block 611). If the barcode is scanned, the images of the item (captured by the cameras (306)), along with the scanned barcode, are linked one with the other, stored and used for re-training as described above, with respect to block 615. If the user indicates that no item was added at all, and that this is a misdetection, a suspicious event can be recorded (block 613) the same way as described above in the Secure Mobile Checkout mode, and the device (300) goes back to wait state—waiting for input. Notably, in some examples only the operations according to blocks 607 and 611 are implemented, such that either the images are correctly processed, and the item is identified or the user is asked to use the barcode for scanning the item.

The checkout process is identical to the one in the Secure Mobile Checkout mode—the user chooses to check out, (for example, selects on the Display). In case it is determined necessary (e.g. by processing circuitry 301), an alert may be generated to a store employee according to some computer logic applied based on, among other things, the recorded suspicious events. In some examples, suspicious events such as an unidentified item that was not scanned by the barcode scanner, can be resolved by requesting the user to scan the item before allowing the user to proceed to checkout.

As explained above with respect to the training mode, the resolution of alerts can be used to determine the correct association between an identification tag and captured images, data which can be added to the training dataset and used for further training the ML models. For example, a suspicious event that is resolved by the user or by a store employee (e.g. during checkout), for example, by selecting a correct item from a list, scanning a barcode of the item using the scanner, or some other manner, provides the correct identification tag of a purchased item. The identification tag can be linked to images captured during the insertion or removal of the item and used to enrich the training dataset.

In the frictionless mode, the images (including both stills and videos) and barcodes collected during the user shopping trips can be used for updating (re-training) the machine learning models of the system, in the same way described above with reference to FIG. 5. For example, the stored data can be uploaded to an AI Training Server (700), configured to re-train the models using the new tagged dataset uploaded, thus improving the performance of the algorithms and their ability to detect and classify items. When an improved model is available, it can be made available to all devices, for example, by uploading the improved model to the devices using the Communication module. This cycle of tagged dataset being leveraged for model training, and improved models being propagated to all devices, can occur automatically and with no intervention of a human system operator. This process allows the system to improve its operation of the machine learning models and even start identifying previously unidentified items automatically over time, without any additional work by a human other than shoppers doing shopping. It provides a scalable solution to the problem of keeping the models up to date as items change their appearance or as new items are introduced, which occurs very often in a typical retail environment.

It is noted that the teachings of the presently disclosed subject matter are not bound by the specific architecture of system described with reference to the figures above. Equivalent and/or modified functionality can be consolidated or divided in another manner and can be implemented in any appropriate combination of software with firmware and/or hardware and executed on a suitable device.

It is further noted that the operations in accordance with the teachings herein may be performed by a computer specially constructed for the desired purposes, or by a general-purpose computer specially configured for the desired purpose by a computer program stored in a non-transitory computer-readable storage medium.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A portable computerized device configured for tracking items in a shopping container; the portable computerized device comprising a scanner, at least one camera, and a processing circuitry comprising one or more computer processors;
   wherein the portable computerized device is designed to be releasably attached to the container, enabling the device to be fixed to a shopping container before commencement of shopping and released from the shopping container at the end of the shopping;
   wherein the at least one camera is configured to capture one or more images of an item being inserted to or removed from the container;
   the processing circuitry is configured to:
      process the one or more images and detect insertion or removal of the item to/from the container;
      identify the item, using one or more machine learning models applied on the one or more images, and add the item to a purchase item-list;
   wherein the scanner is configured to provide scanning output data in response to scanning of a respective identification tag associated with the item.

2. The portable computerized device of claim 1, wherein in case the one or more machine learning models fail to identify the item, the processing circuitry is further configured to generate and prompt instructions to a user requesting the user to scan the respective identification tag with the scanner.

3. The portable computerized device of claim 1, wherein in case the one or more machine learning models fail to identify the item, the processing circuitry is configured to:
   identify the item based on scanning output data generated by the scanner in response to scanning of a respective identification tag associated with the item; and
   link between the one or more images and the respective scanning output data; add the one or more images and the respective scanning output data to a training dataset that is used for training at least one machine learning model to thereby update the training dataset and enable the model to be applied to one or more images of the item and identify the item.

4. The portable computerized device of claim 1, wherein in case the one or more machine learning models identify a plurality of possible identities of the item, the processing circuitry is further configured to:
   generate and prompt instructions to a user requesting the user to select a correct identity from a list listing the plurality of possible identities of the item; and
   responsive to selection of a correct identity by the user, to:
      link between the one or more images and data indicative of the correct identity; and
      update a training dataset to thereby enhance the ability of the model to be applied to one or more images of the item, and identify the item.

5. The portable computerized device of claim 1, wherein the processing circuitry is configured, while operating in training mode, to:
   identify the item based on scanning output data generated by the scanner in response to scanning of a respective identification tag associated with the item; and
   link between the one or more images and the respective scanning output data; add the one or more images and the respective identification of the scanning output data to a training dataset that is used for training at least one machine learning model, to thereby enable the model to be applied to one or more images of the item, and identify the item.

6. The portable computerized device of claim 5, wherein following detection of insertion of the item to the container, and in case no scanning output data or incomplete scanning output data is received from the scanner, the processing circuitry is further configured to execute one or more of:
   i. provide data indicating to a user that the item should be scanned; and
   ii. generate and/or store data indicating that a suspicious event has occurred.

7. The portable computerized device of claim 6, wherein in case of a false-detection or misdetection by the at least one machine learning model, the processing circuitry is configured to:
   link between one or more images captured before the false-detection or misdetection; add the one or more images to a training dataset that is used for training a detection machine learning model serving as an example of false-detection or misdetection to thereby improve detection of insertions by the machine learning model and reduce false positive detections or false negative detections, respectively.

8. The portable computerized device of claim 1, wherein the portable computerized device is designed to be releasably attached to a mount which is fixedly attached to the container and configured to receive and hold the device.

9. The portable computerized device of claim 1, wherein the device is configured to automatically and continuously gather new information including scanning output data linked to respective captured images and thereby enhance and enrich a training dataset of the machine learning model.

10. The portable computerized device of claim 1 is further configured to detect that it has been connected to the container and become ready to be used for shopping in response to the detection.

11. A method of tracking items in a shopping container, the method comprising:
    detecting that a portable computerized device has been releasably attached to a shopping container; the device comprising a scanner, one or more cameras and a processing circuitry comprising one or more computer processors;
    capturing, using at least one camera, one or more images of an item being inserted to or removed from the container;
    utilizing a processing circuitry for:
       processing the one or more images, and detecting insertion or removal of the item to/from the container; and
       identifying the item using one or more machine learning models applied on the one or more images, and adding the item to a purchase item-list.

12. The method of claim 11, further comprising in case the one or more machine learning models fail to identify the item, generating and prompting instructions to a user requesting the user to scan with the scanner an identification tag that is associated with the item.

13. The method of claim 11, further comprising:
    in case the one or more machine learning models fail to identify the item, identifying the item based on scanning output data generated by the scanner in response to scanning of a respective identification tag associated with the item; and
    linking between the one or more images and the respective scanning output data; add the one or more images and the respective scanning output data to a training dataset that is used for training at least one machine learning model to thereby update the training dataset and enable the model to be applied to one or more images of the item, and identify the item.

14. The method of claim 11, further comprising:
    in case the one or more machine learning models identify a plurality of possible identities of the item, generating and prompting instructions to a user requesting the user to select a correct identity from a list listing the plurality of identities of the item;
    responsive to selection of a correct identity by the user, linking between the one or more images and data indicative of the correct identity; updating a training dataset to thereby enhance the ability of the model to be applied to one or more images of the item, and identify the item.

15. The method of claim 11, further comprising:
    while operating in training mode:
       identifying the item based on scanning output data generated by the scanner in response to scanning of a respective identification tag associated with the item; and linking between the one or more images and the respective scanning output data; add the one or more images and the respective identification of the scanning output data to a training dataset that is used for training at least one machine learning model to thereby enable the model to be applied to one or more images of the item, and identify the item.

16. The method of claim 11, further comprising:
following detection of insertion or removal of the item to/from the container, and in case no scanning output data or incomplete scanning output data is received from the scanner, executing one or more of:
  i. providing data indicating to a user that the item should be scanned; or
  ii. generating an alert indicating that a suspicious event has occurred.

17. The method of claim 11, further comprising automatically and continuously gathering new information including scanning output data linked to respective captured images and thereby enhancing a training dataset of the machine learning model.

18. The method of claim 11, further comprising:
in case of a false-detection or miss-detection by the one or more machine learning model:
  linking between one or more images captured before the false-detection or miss-detection; adding the one or more images to a training dataset that is used for training a detection machine learning model serving as an example of false-detection or miss-detection to thereby improve detection of insertions by the machine learning model and reduce false positive detections or false negative detections, respectively.

19. The method of claim 18, further comprising:
before onset of shopping, releasably attaching the portable computerize device to the container; and
following checkout, removing the portable computerized device from the container.

20. The method of claim 19, further comprising:
retrieving the portable computerized device from a pickup terminal before releasably attaching the portable computerized device to the shopping container; and returning the portable computerized device back to the pickup terminal following checkout.

21. The method of claim 18, further comprising: receiving user credentials via a pickup terminal or the portable computerize device; executing an user authentication process and releasing the portable computerized device from being locked in the pickup terminal, in case the user authentication process is successful.

22. A non-transitory computer readable storage medium tangibly embodying a program of instructions that when executed by a computer, causing the computer to perform a method of tracking items in a shopping container, the method comprising:
  detecting that a portable computerized device has been releasably attached to a shopping container; the device comprising a scanner, one or more cameras and a processing circuitry comprising one or more computer processors;
  capturing, using at least one camera, one or more images of an item being inserted to or removed from the container;
  processing the one or more images, and detecting insertion or removal of the item to/from the container;
  identifying the item using one or more machine learning models applied on the one or more images and adding the item to a purchase item-list.

23. A computerized system for fast checkout, the computerized system comprising:
  a plurality of portable computerized devices, each configured for tracking items in a respective shopping container, and a training computer server device operatively connected to the plurality of portable devices over a communication network;
  wherein each portable computerized device is designed to be releasably attached to the respective shopping container, enabling the device to be fixed to the respective shopping container before onset of shopping and released from the respective shopping container at the end of the shopping;
  each portable computerized device comprises a scanner and at least one camera and a processing circuitry;
  wherein at least one camera of each device is configured to capture one or more images of an item being inserted into or removed from the container;
  wherein the processing circuitry of each portable computerized device is configured, while operating in training mode, to:
    identify the item based on scanning output data generated by the scanner in response to scanning of a respective identification tag associated with the item; and
    link between the one or more images and the respective scanning output data to thereby give rise to linked-data; transmit the linked-data to the training computer server device;
  wherein the training computer server device is configured to:
    add the linked-data to a training dataset that is used for training one or more machine learning models to thereby enable the model to be applied to one or more images of the item and identify the item; and
    transmit the one or more machine learning models to the plurality of portable computerized devices;
  the processing circuitry of each portable computerized device is configured to:
    process the one or more images and detect insertion or removal of the item from the container;
    identify the item using the one or more machine learning models applied on the one or more images, and add the item to a purchase item-list.

24. A computerized system for fast checkout, the computerized system comprising:
  a pickup terminal and a plurality of portable computerized devices, each portable computerized device is configured for tracking items in a respective shopping container; and a training computer server device operatively connected to the plurality of portable devices over a communication network;
  wherein the pickup terminal comprises a plurality of cradles, each cradle being configured to store a portable computerized device; wherein each portable computerized device is designed to be released from a respective cradle at a beginning of shopping and be releasably attached to the respective shopping container, and be released from the respective shopping container and placed back at a cradle, at the end of shopping;
  each portable computerized device comprises a scanner and at least one camera and a processing circuitry;
  wherein at least one camera of each device is configured to capture one or more images of an item being inserted into or removed from the respective shopping container;
  the processing circuitry is configured to:

process the one or more images and detect insertion or removal of the item to/from the respective shopping container;

identify the item, using one or more machine learning models applied on the one or more images, and add the item to a purchase item-list.

25. The computerized system of claim 17, wherein each portable computerized device is locked within a respective cradle; wherein the pickup terminal is configured to receive input comprising shopper credentials and transmit the credentials to a server being operatively connected to the pickup terminal; the server is configured to execute an authentication process and allow release of a portable computerized device from its respective cradle in case the authentication process is successful.

26. A method of shopping with fast checkout, the method comprising:

at a beginning of shopping, retrieving a portable computerized device from a pickup terminal and releasably connecting the portable computerized device to a shopping cart; the portable computerized device comprising a scanner, one or more cameras and a processing circuitry comprising one or more computer processors;

inserting an item to the shopping cart thereby causing the computerized device to execute operations including:

capturing, using at least one camera, one or more images of an item being inserted to or removed from the shopping cart;

processing the one or more images, and detecting insertion or removal of the item to/from the shopping cart;

identifying the item using one or more machine learning models applied on the one or more images, and adding the item to a purchase item-list;

at the end of shopping, interacting with the portable computerized device for generating data indicative of a desire to proceed to checkout;

complete payment for the items listed in the purchase item-list; and remove the portable computerize device from the shopping cart and retrieving the portable computerized device to the pickup terminal.

* * * * *